(12) United States Patent
Kim

(10) Patent No.: US 11,166,595 B2
(45) Date of Patent: Nov. 9, 2021

(54) FOOD PROCESSOR

(71) Applicant: NUC Electronics Co., Ltd., Daegu (KR)

(72) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 293 days.

(21) Appl. No.: 16/192,488

(22) Filed: Nov. 15, 2018

(65) Prior Publication Data
US 2020/0138242 A1 May 7, 2020

(30) Foreign Application Priority Data
Nov. 7, 2018 (KR) .................. 10-2018-0136003

(51) Int. Cl.
*A47J 43/07* (2006.01)
*F25B 21/02* (2006.01)

(52) U.S. Cl.
CPC ........... *A47J 43/0716* (2013.01); *F25B 21/02* (2013.01)

(58) Field of Classification Search
CPC .. A47J 43/0716; A47J 43/0727; A47J 41/005; F25B 21/02; F25B 2321/023; F25D 31/006; H01L 35/30
See application file for complete search history.

(56) References Cited

U.S. PATENT DOCUMENTS

| 4,927,087 | A | | 5/1990 | Palochak | |
|---|---|---|---|---|---|
| 5,209,069 | A | * | 5/1993 | Newnan | B01F 13/0827 222/146.6 |
| 6,619,045 | B1 | | 9/2003 | Clark | |
| 7,308,796 | B1 | * | 12/2007 | Eager | F25B 21/02 62/3.2 |
| 7,997,786 | B2 | | 8/2011 | Liu | |
| 2010/0018982 | A1 | | 1/2010 | Liu | |
| 2013/0334349 | A1 | | 12/2013 | Carden | |

FOREIGN PATENT DOCUMENTS

| CN | 2478362 Y | | 2/2002 |
|---|---|---|---|
| JP | 2011245119 A | | 12/2011 |
| JP | 2014233555 A | * | 12/2014 |
| JP | 2014233555 A | | 12/2014 |
| KR | 200459379 B1 | | 3/2012 |
| KR | 200459379 Y1 | * | 3/2012 |
| KR | 101303618 B1 | | 9/2013 |
| KR | 20160049862 A | | 5/2016 |
| WO | 2011148982 A1 | | 12/2011 |

OTHER PUBLICATIONS

Australian Examination report issued in related application No. 2018264065 dated Apr. 18, 2019.
European Search Report issued in related application No. EP18206311.5 dated May 27, 2019.

* cited by examiner

Primary Examiner — Ana M Vazquez

(57) ABSTRACT

A food processor includes: a main body; and a container that forms a food-containing space for containing food items and is detachably mounted to the main body, wherein the main body comprises a cold energy generator for transmitting cold energy to the container by coming into contact with at least part of the container, with the container mounted on the main body.

12 Claims, 8 Drawing Sheets

FOOD PROCESSOR

CROSS-REFERENCE TO RELATED APPLICATIONS

This application claims priority to Korean Patent Application No. 10-2018-0136003 filed on Nov. 7, 2018 in Korea, the entire contents of which are hereby incorporated by reference in their entirety.

BACKGROUND OF THE INVENTION

Field of the Invention

The present invention relates to a food processor, and more particularly, to a food processor for performing tasks such as the grinding, processing, and preparing of food.

Related Art

There are a variety of food processors for performing tasks such as grinding, mixing, and squeezing of food.

Food processors are normally used by placing food items into their container and processing the food items using a processing member such as a blade or screw.

However, there are no conventional food processors that offer a refrigeration function.

SUMMARY OF THE INVENTION

The present invention provides a food processor for keeping food fresh or preparing it.

Technical problems to be solved by the present invention are not limited to the above-mentioned technical problems, and other technical problems not mentioned herein may be clearly understood by those skilled in the art from description below.

An exemplary embodiment of the present invention provides a food processor including: a main body; and a container that forms a food-containing space for containing food items and is detachably mounted to the main body, wherein the main body comprises a cold energy generator for transmitting cold energy to the container by coming into contact with at least part of the container, with the container mounted on the main body.

The container may include a conductive plate for conducting cold energy provided by the cold energy generator to the food-containing space by coming into contact with the cold energy generator.

The conductive plate may be detachably mounted to the container.

The cold energy generator may include: a heat-transfer element for generating cold energy; a heat sink for supporting the heat-transfer element and dissipating heat generated from the heat-transfer element; and a hot air vent port for releasing hot air dissipated by the heat sink.

The heat-transfer element may include a Peltier element, the Peltier element having a heat-generating surface facing the heat sink and a heat-absorbing surface facing the container.

The cold energy generator may include a cold energy generating unit that forms a refrigeration space for containing part of the container and surrounds the side of the refrigeration space.

The cold energy generating unit may include a plurality of heat-transfer elements arranged to surround the side of the refrigeration space, and the cold energy generator may further include a heat sink that surrounds the side of the refrigeration space, supports the heat-transfer elements, and dissipates heat generated from the heat-transfer elements.

The refrigeration space may have a bowl shape in which the cross-sectional area increases towards the container, in order to hold part of the container in the refrigeration space and allow the cold energy generator to support the container.

The cold energy generator may include a cold energy transfer plate that determines the lateral shape of the refrigeration space, wherein the cold energy transfer plate is ring-shaped, with the inside and outside formed on different planes and the inside being closer to the center of the main body than the outside.

A part of the container held in the refrigeration space may have a wedge shape corresponding to the bowl shape, and the part of the container may be formed with a conductive plate that conducts cold energy transmitted from the cold energy transfer plate to the food-containing space by coming into contact with the cold energy transfer plate, with the container mounted on the main body.

The container may include a processing member that is rotatably mounted within the food-containing space and processes the food items, the main body may further include a motor and a power transmitter for transmitting the torque of the motor to the processing member, and the power transmitter may be connected to the processing member through the refrigeration space.

The container may include a processing member that is rotatably mounted within the food-containing space and processes the food items, the main body may further include a motor and a power transmitter for transmitting the torque of the motor to the processing member, the cold energy generator may further include a container combining space formed below the refrigeration space so as to connect to the refrigeration space, and the power transmitter may be exposed to the container combining space and connected to the processing member.

The container may include a processing member that is rotatably mounted within the food-containing space and processes the food items, the main body may further include a base including a motor and a power transmitter for transmitting the torque of the motor to the processing member, and the cold energy generator may be provided on the base in such a manner that the end of the power transmitter is externally exposed.

The cold energy generator may include: a heat-transfer element for generating cold energy; a heat sink for supporting the heat-transfer element and dissipating heat generated from the heat-transfer element; and a hot air vent port for releasing hot air dissipated by the heat sink, wherein the hot air vent port forms a portion of the side of the main body.

The cold energy generator may form a container receiving space for receiving the bottom of the container, and the heat-transfer element, the heat sink, and the hot air vent port may be configured to surround the side of the container receiving space, and the end of the power transmitter may be exposed within the container receiving space.

The food processor may further include a cold energy transfer plate that is located between the heat-transfer element and the container, transmits the cold energy of the heat-transfer element to the container, and allows the container to be seated in place.

The main body may further include a blower unit that supplies air to the cold energy generator and allows the air to flow around the container after the air passes through the cold energy generator and cools down.

The food processor may further include an enclosure for enclosing the container, wherein the air provided by the blower unit is supplied between the container and the enclosure after the air passes through the cold energy generator and cools down.

Other detailed matters of the present invention are included in the detailed description and the accompanying drawings.

DESCRIPTION OF EXEMPLARY EMBODIMENTS

Figure 1:
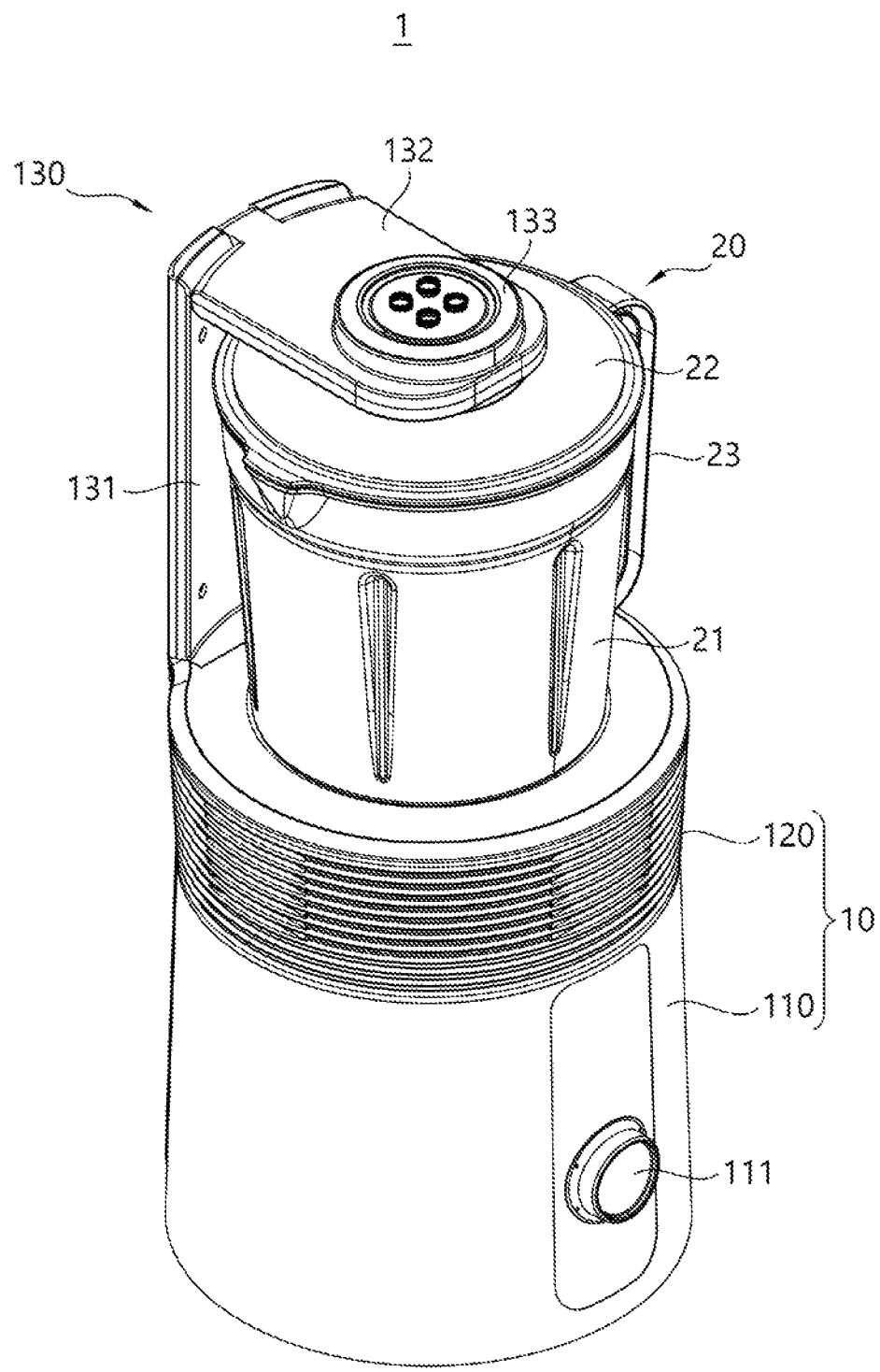
FIG. 1 is a perspective view of a food processor according to an exemplary embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Like reference numerals refer to like elements throughout the specification.

The embodiments to be described herein will be described with reference to cross-sectional views and/or schematic diagrams, which are ideal exemplary views of the present disclosure. Therefore, the forms of the exemplary views may be changed due to manufacturing techniques and/or allowable errors. For the convenience of description, constituent elements in the drawings of exemplary embodiments may be slightly enlarged or reduced. Like reference numerals refer to like elements throughout the specification.

Hereinafter, a food processor according to an exemplary embodiment of the present invention will be described with reference to the drawings.

Figure 2:
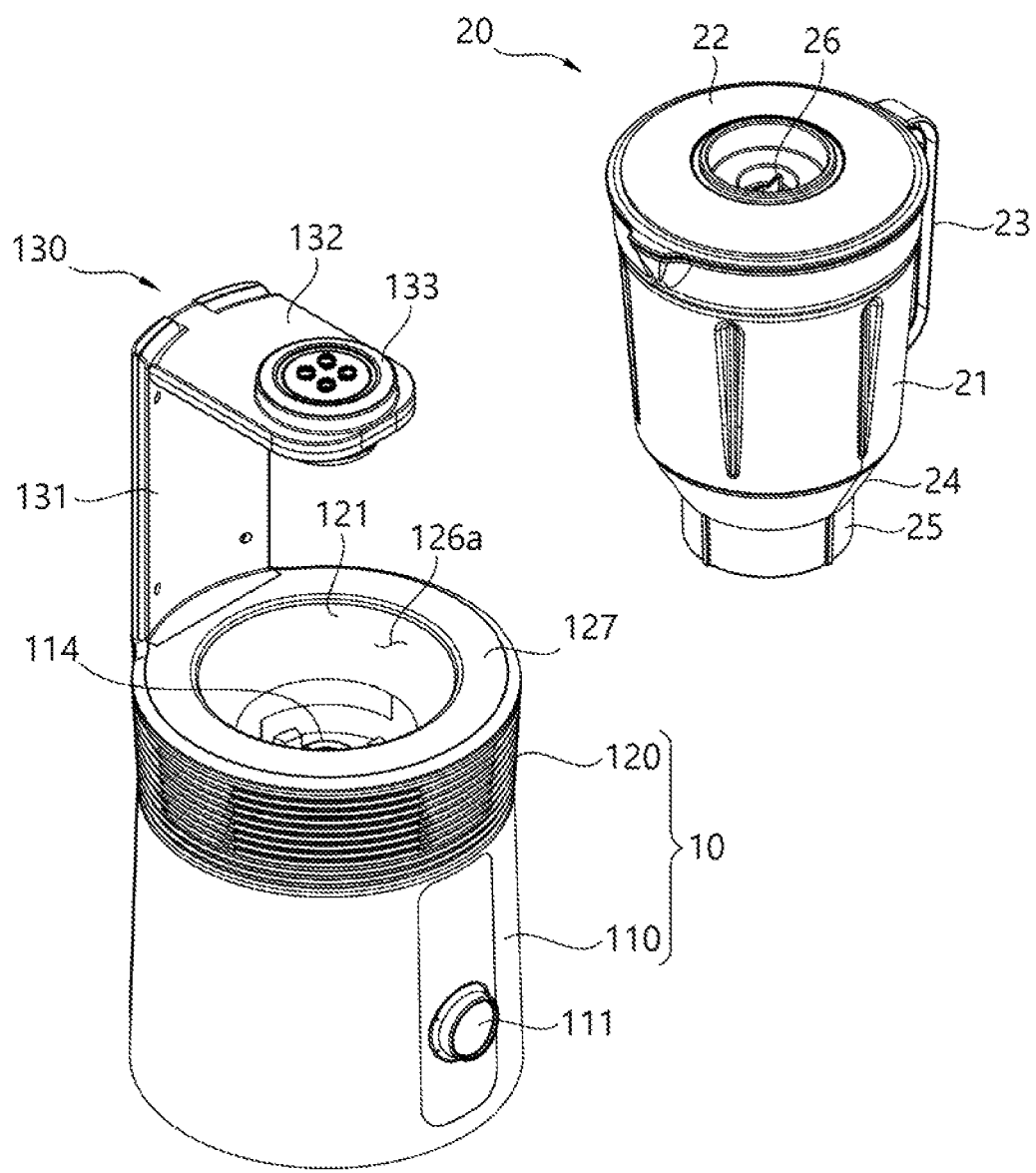
FIG. 2 is an exploded perspective view of the food processor shown in FIG. 1.
Figure 3:
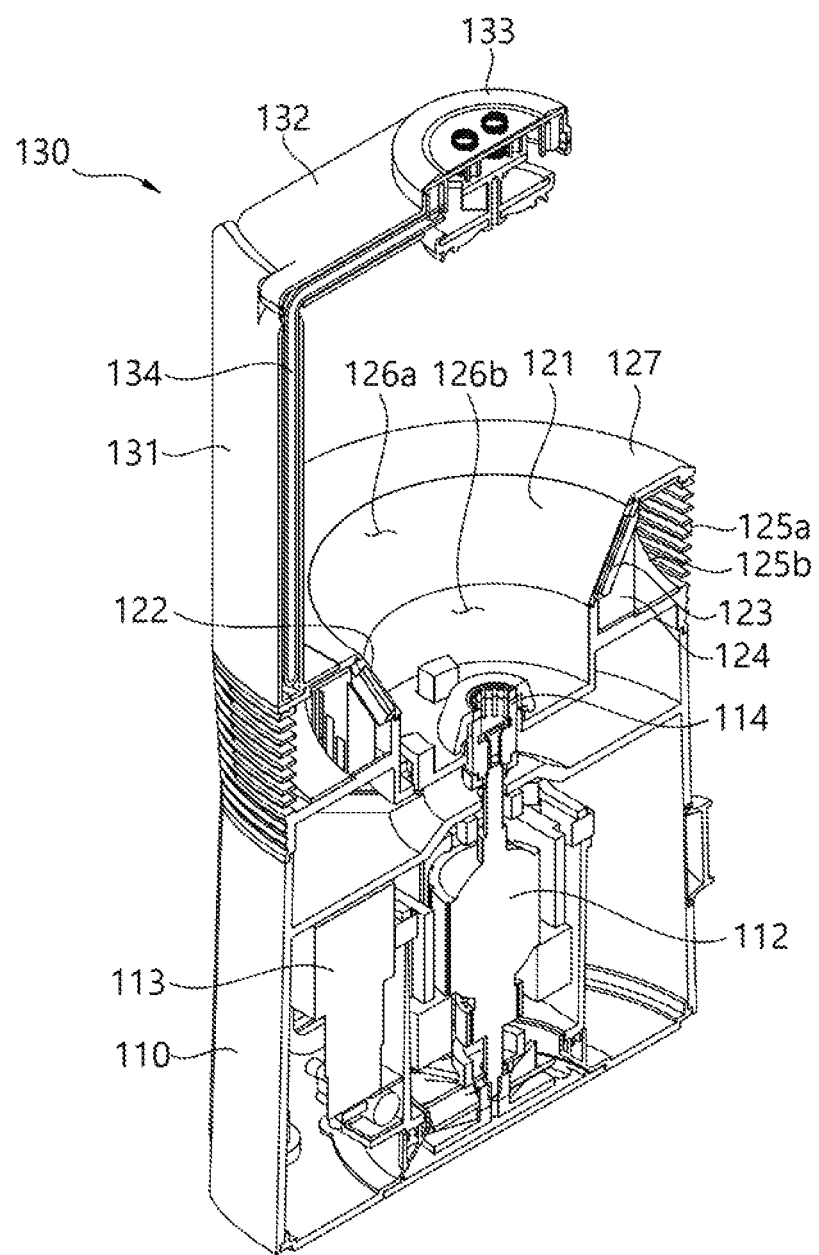
FIG. 3 is a longitudinal sectional view of the main body shown in FIG. 2.

FIG. 1 is a perspective view of a food processor according to an exemplary embodiment of the present invention. FIG. 2 is an exploded perspective view of the food processor shown in FIG. 1. FIG. 3 is a longitudinal sectional view of the main body shown in FIG. 2.

As shown in FIGS. 1 and 2, a food processor 1 according to an exemplary embodiment of the present invention includes a main body 10 and a container 20, and the main body 10 includes a base 110 and a cold energy generator 120.

The base 110 may internally include a motor 112, a vacuum pump 113, and a circuit board (not shown) for controlling the motor 112 and the vacuum pump 113. Although, in some embodiments, the motor 112 and/or vacuum pump 113 may be selectively included, the following description will be given of a food processor 1 including both the motor 112 and the vacuum pump 113.

A manipulating means 111 for manipulating the food processor 1 may be provided on the front and/or side of the base 110. Although this exemplary embodiment illustrates a dial for controlling the output of the motor 112 or vacuum pump 113 as the manipulating means 111, manipulating means such as a capacitive or pressure-sensitive touch display, an electrode switch, etc. may be used.

The cold energy generator 120 is provided on the base 110.

The cold energy generator 120 is a component where a container 20 mounted onto the main body 10 is seated and secured and which provides cold energy to the container 20.

As shown in FIGS. 2 and 3, the cold energy generator 120 includes a space 126a and 126b for holding part (a conductive plate 24 and a bottom rim 25) of the container 20 so that part of the container 20 is held in it when the container 20 is mounted on the main body 10. A concrete description of the cold energy generator 120 will be given later.

As shown in FIG. 2, the food processor 1 according to this exemplary embodiment further includes a vacuum supply 130 that supplies vacuum pressure from the vacuum motor 113 to the container 20. The vacuum supply 130 includes a supporting post 131, a swing arm 132, and an intake port 133.

The supporting post 131 may extend upward from one side of the cold energy generator 120.

The swing arm 132 is rotatably mounted at the top edge of the supporting post 131, and the intake port 133 is provided on an end of the swing arm 132.

The intake port 133 is connected to the vacuum pump 113 via a vacuum exhaust line 134. The vacuum exhaust line 134 may be placed in such a way as to pass through the insides of the swing arm 132 and supporting post 131. It is preferred that the vacuum exhaust line 134 is made of a highly flexible material so as to deform along the swing arm 132 when the swing arm 132 and the intake port 133 pivoting on the supporting post 131.

When the vacuum pump 113 operates while the intake port 133 is securely attached to a lid 22 of the container 20, vacuum pressure created by the vacuum pump 113 is transmitted to a food-containing space 27 of the container 20 through the vacuum exhaust line 134 and the intake port 133. Thus, the air in the food-containing space 27 is expelled through the intake port 133.

As shown in FIG. 1, the intake port 133 is securely attached to the lid 22 of the container 20 so that vacuum pressure created by the vacuum pump 113 is transmitted to the food-containing space 27 in a receptacle 21 through the vacuum exhaust line 134, intake port 12, and lid 22.

The cold energy generator 120 will be described in details below.

Figure 4:
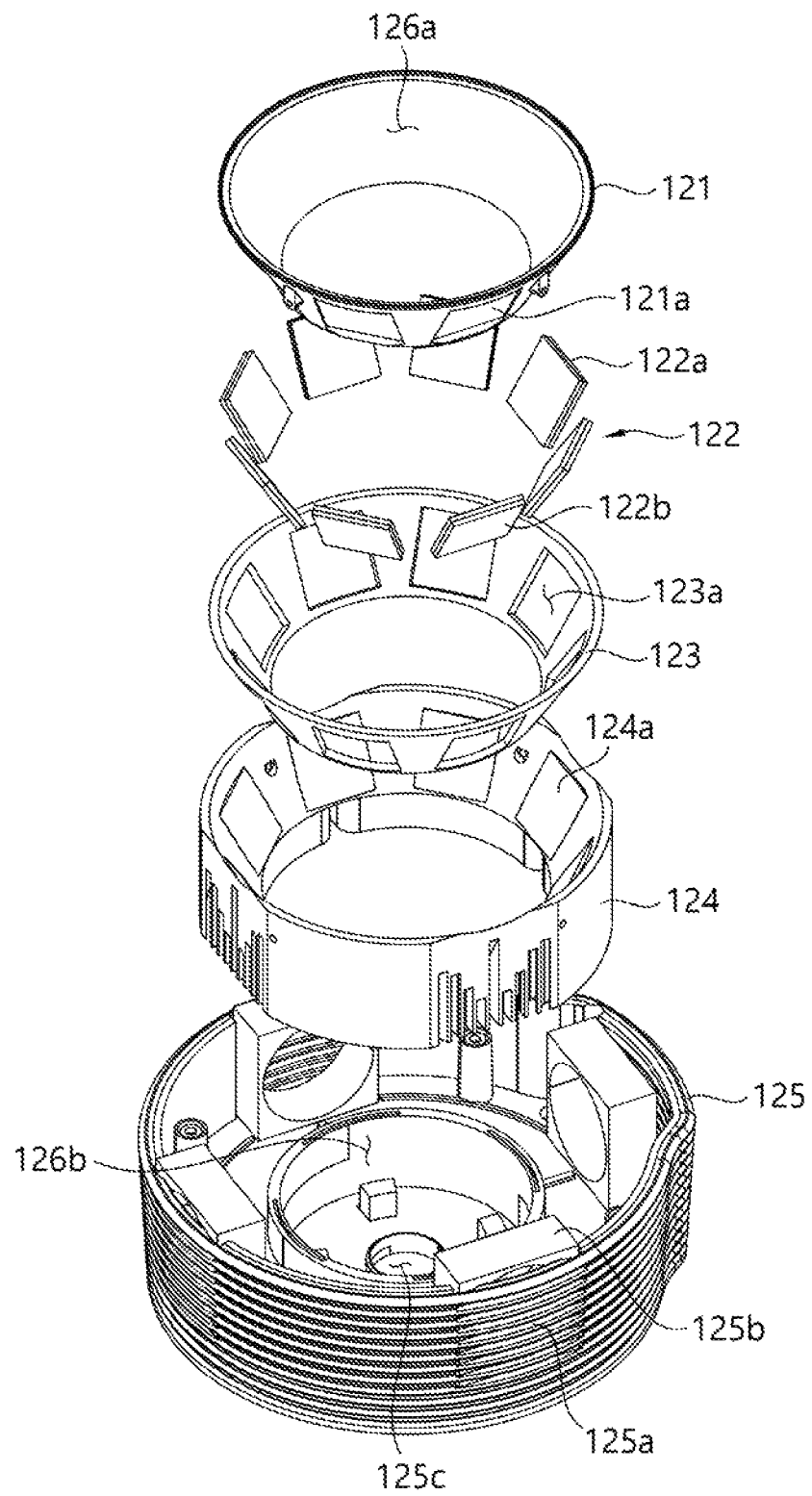
FIG. 4 is an exploded perspective view of part of the cold energy generator shown in FIG. 3.
Figure 5:
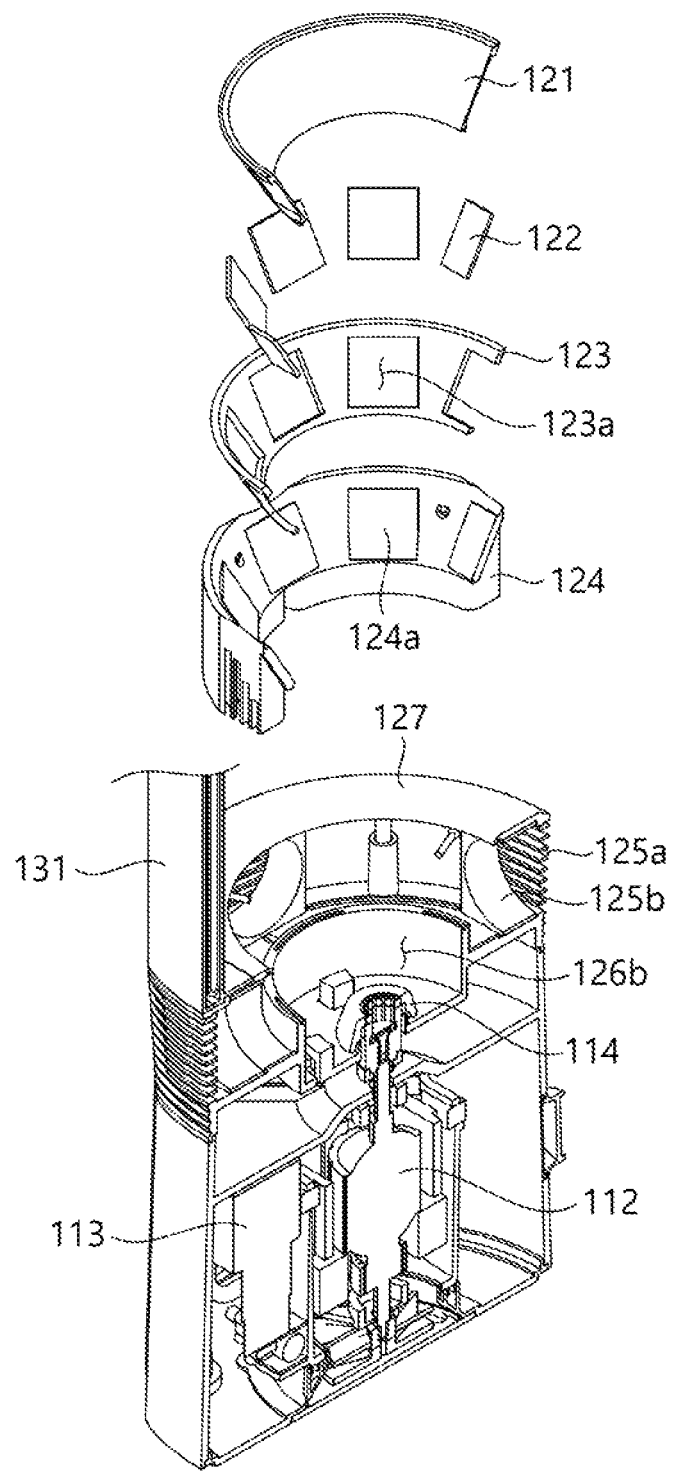
FIG. 5 is a longitudinal sectional view of the exploded perspective view of the main body shown in FIG. 2.

FIG. 4 is an exploded perspective view of part of the cold energy generator shown in FIG. 3. FIG. 5 is a longitudinal sectional view of the exploded perspective view of the main body shown in FIG. 2.

As shown in FIGS. 4 and 5, the cold energy generator 120 includes a cold energy transfer plate 121, a cold energy generating unit 122, a support frame 123, a heat sink 124, a housing 125, and a top plate 127.

The cold energy transfer plate 121 may be configured to form a bowl-shaped refrigeration space 126a. More specifically, the refrigeration space 126a is formed in such a way that its horizontal cross-sectional area increases towards the container 20, and the bottom of the refrigeration space 126a is open to connect to a container combining space 126b formed below the refrigeration space 126a.

To this end, the cold energy transfer plate 121 is ring-shaped, with the inside and outside formed on different planes and the inside being closer to the center of the main body than the outside. That is, the cold energy transfer plate 121 may be in the shape of a tube that expands towards the container 20.

The bowl-shaped refrigeration space 126a may improve cold energy transfer efficiency, and at the same time the refrigeration space 126a may support the container 20.

Preferably, the cold energy transfer plate 121 is made of a highly thermal conductive material in order to efficiently transfer heat generated by the cold energy generating unit 122 to be described later towards the container 20. Also, the cold energy transfer plate 121 is a member that comes into contact with the conductive plate 24 of the container 20, with the container 20 mounted on the main body 10; hence, it is preferable that the cold energy transfer plate 121 is made of a highly wear-resistant material. Also, it is preferable that the cold energy transfer plate 121 is made of a highly corrosion-resistant material because frost may form on the surface of the cold energy transfer plate 121 due to the temperature difference between the cold energy transmitted to the cold energy transfer plate 121 and the atmospheric air.

The cold energy generating unit 122 is a component that generates cold energy, and may consist of a plurality of heat-transfer elements that are supplied with electrical energy from the main body 10 and produce cold energy. While the following description will be given by an example of using Peltier elements as the heat-transfer elements, the present invention is not limited to this example, and other types of heat-transfer elements than the Peltier elements or other components besides the heat-transfer elements may be used as long as they are able to generate cold energy.

The Peltier elements are elements that use the Peltier effect in which a temperature difference occurs when an electric current flows through two different metals connected to each other. If a direct current voltage is applied to both ends of a Peltier element, heat absorption occurs on one side and heat generation occurs on the other side depending on the direction of the current.

As shown in FIGS. 4 and 5, the cold energy generator 120 according to this exemplary embodiment includes a plurality of Peltier elements 122 arranged in an approximately circular pattern. Each Peltier element 122 is fitted in such a way that a heat-absorbing surface 122a faces the container 20 and a heat-generating surface 122b faces the heat sink 124.

Therefore, the heat-absorbing surface 122a comes into contact with the outer surface of the cold energy transfer plate 121, and the heat-generating surface 122b comes into contact with a heat-transfer element mounting surface 124a of the heat sink 124.

As shown in FIG. 4, heat-absorbing surface receiving slots 121a for receiving the heat-absorbing surfaces 122a may be formed on the outer surface of the cold energy transfer plate 121.

The support frame 123 may be provided between the cold energy transfer plate 121 and the heat sink 124 to support the plurality of Peltier elements 122. The support frame 123 may be formed in a bowl shape similar to that of the cold energy transfer plate 121, and heat-transfer element mounting slots 123a for confining the mounting positions of the plurality of Peltier elements 122 and securely supporting the plurality of Peltier elements 122 may be formed to correspond one-to-one to the positions of the Peltier elements 121.

The heat sink 124 is in contact with the heat-generating surfaces 122b of the Peltier elements 122 and dissipates heat generated from the heat-generating surfaces 122b of the Peltier elements 122.

The top surface of the heat sink 124 is formed in a bowl shape to support the support frame 123 and the Peltier elements 122, and, as described above, heat-transfer element mounting surfaces 124a where the heat-generating surfaces 122b of the Peltier elements 122 are mounted may be formed on the top surface of the heat sink 124. Preferably, the heat sink 124 may be formed of a highly thermal conductive material so as to efficiently dissipate heat generated from the Peltier elements 122.

As shown in FIG. 4, the heat sink 124 too has an overall ring shape to enclose the refrigeration space 126a, with its heat dissipating fins extending downward from the top surface where the heat-transfer element mounting surfaces 124a are formed, thereby improving heat dissipation and at the same time forming a container combining space 126b below the refrigeration space 126a.

The housing 125 is configured to enclose the heat sink 124, in order to hold and fix the heat sink 124 in place.

As shown in FIG. 4, the housing 125 includes a power transmitter recess 125c formed through the bottom surface. As shown in FIG. 5, the power transmitter receiving recess 125c is a component for inserting a power transmitter 114 connected to an output shaft of the motor 112 therethrough.

The housing 125 may be formed with a dividing wall around the power transmitter receiving recess 125c to define the container combining space 126b. The cold energy transfer plate 121 and/or support frame 123 are placed on the dividing wall, and the heat sink 124 is located outside the container combining space 126b with respect to the dividing wall. As shown in FIG. 5, the power transmitter 114, inserted into the housing 125 through the power transmitter receiving recess 125c, may be exposed within the container combining space 126b or refrigeration space 126a of the cold energy generator 120.

The housing 125 includes at least one fan block 125b located between the outer surface of the housing 125 and the heat sink 124. A hot air vent port 125a is formed on the outer surface of the housing 125, corresponding to the fan block 125b. A fan (not shown) for blowing out hot air dissipated by the heat sink 124 may be included in the fan block 125b so as to let out the hot air dissipated by the heat sink 124 to the hot air vent port 125a.

As shown in FIGS. 1 and 2, the outer surface of the housing 125 has a horizontal sectional shape which is the same as or similar to that of the outer surface of the base 110, thereby giving a better sense of unity between the base 110 and the housing 125.

As shown in FIG. 5, the top plate 127 is a cover member that extends to the top edge of the cold energy transfer plate 121 from the top edge of the outer surface of the housing 125. In some embodiments, the top plate 127 may be used as a component for mounting part of the container 20 or supporting part of the container 20.

Figure 6:
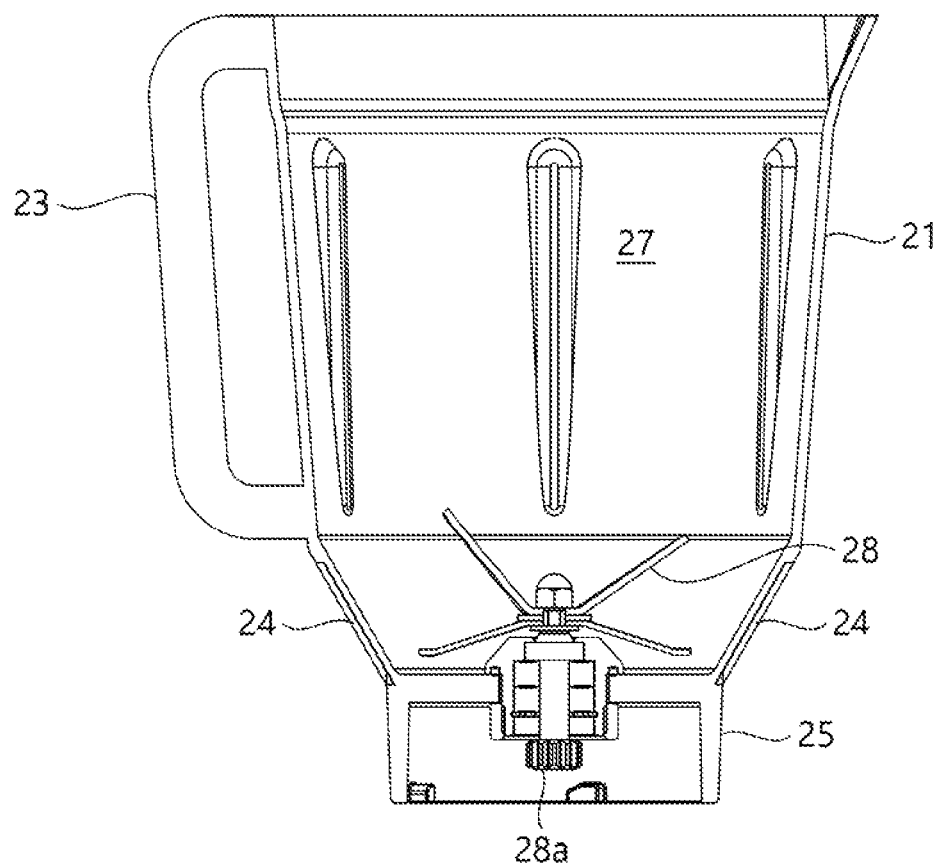
FIG. 6 is a longitudinal sectional view of part of the container shown in FIG. 2.
Figure 7:
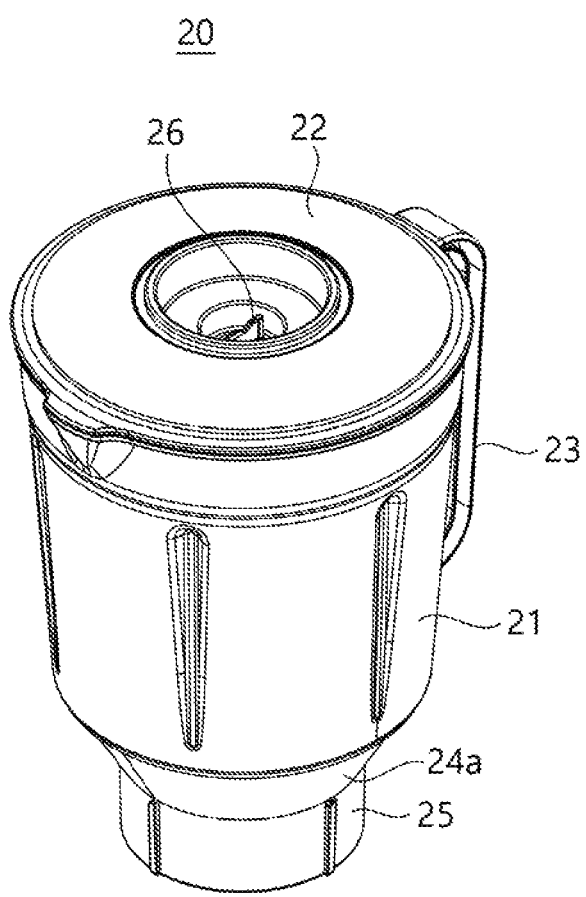
FIG. 7 is an exploded perspective view of the container shown in FIG. 2.
Figure 7:
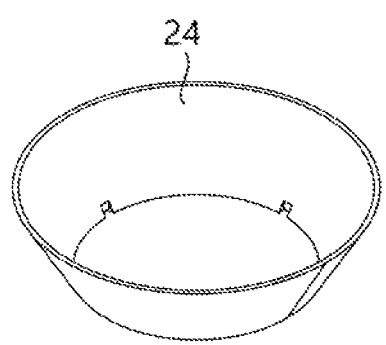

FIG. 6 is a longitudinal sectional view of part of the container shown in FIG. 2. FIG. 7 is an exploded perspective view of the container shown in FIG. 2.

As shown in FIGS. 6 and 7, the container 20 may include a receptacle 21, a lid 22, a handle 23, a conductive plate 24, and a bottom rim 25.

The receptacle 21 forms a food-containing space 27 for containing food items to prepare, and the container 20 may include a processing member 28 that is rotatably mounted within the receptacle 21 and processes the food items. The processing member 28 may be a blade or the like for grinding food items.

A coupling gear 28a for coupling to the processing member 28 is provided below the outside of the receptacle 21. The processing member 28 and the coupling gear 28a are connected by a connecting shaft that penetrates the receptacle 21 and is rotatable with respect to the receptacle 21. The coupling gear 28a is attached to the power transmitter 114 which is exposed within the refrigeration space 126a and/or container combining space 126b of the cold energy generator 120, and transmits the torque of the motor 112 to the processing member 28.

The bottom rim 25 extends downward from the side of the receptacle 21, and is inserted into the container combining space 126b of the cold energy generator 120 so that the container 20 is mounted on the main body 10.

The area under the food-containing space 27 where the processing member 28 is provided is shaped in such a way that its horizontal sectional area decreases gradually towards the bottom. To this end, the side 24a of the lower part of the receptacle 21 is wedge-shaped and extends down to the bottom rim 25. An assembly space where the conductive plate 24 can be mounted is formed on the lower part side 24a.

As shown in FIG. 7, the conductive plate 24 is detachably mounted to the lower part side 24a so that the user can remove the conductive plate 24 and wash it if required.

The conductive plate 24 is a component that comes into contact with the cold energy transfer plate 121 of the cold energy generator 120, with the container 20 mounted on the main body 10, and is preferably made of a highly wear-resistant material. Also, it is preferable that the conductive plate 24 is made of a highly corrosion-resistant material because frost may form on the surface of the conductive plate 24 due to the temperature difference between the cold energy transmitted to the cold energy transfer plate 12 and the air.

The conductive plate 24 may have a shape complementary to the shape of the cold energy transfer plate 121 so as to be securely attached to the cold energy transfer plate 121.

The handle 23 is formed on one side of the receptacle 21 to make it easy for the user to remove the container 20 from the main body 10 or move the container 20 to the main body 10 and fit it onto the main body 10.

The lid 22 is a component for covering the open top of the receptacle 21, and the lid 22 has a sealing member where it comes into contact with the receptacle 21, in order to keep the food-containing space 27 airtight.

A valve 26 is provided on the lid 22. When the vacuum pump 113 operates while the intake port 133 is securely attached to the lid 22 of the container 20, air is pulled out of the food-containing space 27 through the valve 26.

Even if the lid 22 and the intake port 133 are separated from each other by moving the container 20 from the swing arm 132 when the internal pressure of the food-containing space 27 is lower than the atmospheric pressure, the valve 26 still prevents outside air from entering the food-containing space 27 due to the difference between the atmospheric air and the internal pressure of the food-containing space 27. In this instance, if the user wants to separate the receptacle 21 and the lid 22, they may easily separate the receptacle 21 and the lid 22 by pushing or pulling the valve 26, because there is no pressure difference between the inside and outside of the receptacle 21 as outside air enters the food-containing space 27.

As described above, the food processor 1 according to an exemplary embodiment of the present invention includes a cold energy generator 120 to keep processed and/or unprocessed food items fresh in the container 20 as needed by the user.

For example, the user can cut food items that they will prepare in the morning using the food processor 1, put them in the receptacle 21, place the container 20 on the main body 10, and then run the cold energy generator 120 to keep the food items fresh during the night. In the morning, the user can simply prepare the food by running the processing member 28. This way, the user can easily prepare and enjoy their meals in the busy morning hours when they are getting ready for office or school. Moreover, if the user has leftover food in the container 20 after finishing the food they prepared with the food processor 1, they may keep the leftover food fresh by running the cold energy generator 120.

Furthermore, the food processor 1 including the cold energy generator 120 according to an exemplary embodiment of the present invention allows for putting food ingredients and a liquid such as milk in the receptacle 21 and processing them, and even allows for making slush, ice cream, etc. simply by running the cold energy generator 120.

A food processor according to another exemplary embodiment will be described below. For convenience of explanation, the same reference numerals are used to denote parts similar to those in the foregoing exemplary embodiment, and descriptions of parts common to this exemplary embodiment and the foregoing exemplary embodiment will be omitted.

Figure 8:
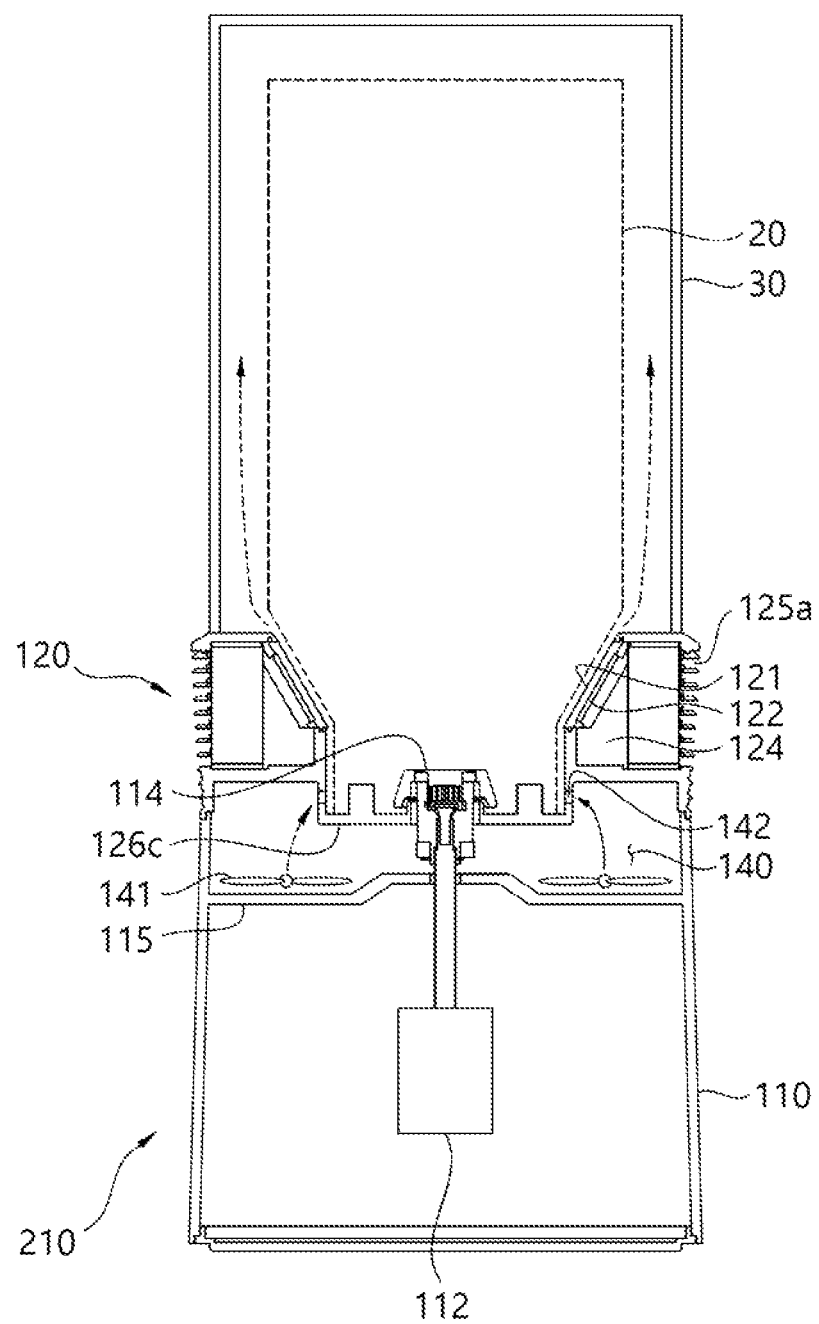
FIG. 8 is a cross-sectional view schematically showing a food processor according to another exemplary embodiment of the present invention.

FIG. 8 is a cross-sectional view schematically showing a food processor according to another exemplary embodiment of the present invention.

As shown in FIG. 8, the main body 210 of the food processor 2 according to this exemplary embodiment further includes a blower unit 141, as compared to the food processor 1 according to the foregoing exemplary embodiment. The blower unit 141 may be placed between the cold energy generator 120 and the base 110 and configured to supply air towards the cold energy generator 120.

To this end, as shown in FIG. 8, the main body 210 may include a blower unit mounting space 140 for mounting the blower unit 141 between the cold energy generator 120 and the base 110.

The ceiling of the blower unit mounting space 140 may correspond to the bottom 126c of the container combining space 126b, and the bottom thereof may correspond to the top surface 115 of the base 110.

A blower port 142 connecting the blower unit mounting space 140 and the container combining space 126b is provided to direct the flow of air produced by the blower unit 141 from the blower unit mounting space 140 to the container combining space 126b. As shown in FIG. 8, the blower port 142 may be formed through the side of the container combining space 126b, but in some embodiments the blower port 142 may be located elsewhere as long as the blower unit mounting space 140 and the container combining space 126b can be connected together. For example, the blower port 142 may be formed through the bottom 126c of the container combining space 126b.

The air produced by the blower unit 141 and passed through the blower port 142 cools down and turns into cold air as it passes through the cold energy generator 120. Concretely speaking, the air passed through the blower port 142 turns into cold air as it passes through the refrigeration space 126a and the cold energy transfer plate 121. To facility the supply of air produced by the blower unit 141, an air inlet (not shown) may be formed on the side or bottom of the blower unit mounting space 140 to draw air into the blower unit mounting space 140.

The cold air passes through between the container 20 and the cold energy generator 120, more specifically, between the container 20 and the cold energy transfer plate 121, and flows around the container 20.

The food processor 2 according to this exemplary embodiment allows for keeping food fresh in the container 20 in a more efficient way, because the cold energy generator 120 cools the lower part of the container 20 and at the same time the cold air cools the upper part of the container 20.

As shown in FIG. 8, if an encloser 30 for enclosing the container 20 is included, the cold air supplied between the container 20 and the enclosure 30 is maintained between the container 20 and the enclosure 30, thereby improving the cooling efficiency of the cold air in the upper part of the container 20.

Although FIG. 8 illustrates an example in which the blower unit 141 is mounted in a dedicated blower unit mounting space 140, no dedicated blower unit mounting space 140 will be included in some embodiments but the blower unit 141 may be placed within the base 111. In this case, the flow of air produced by the blower unit 141 may be directed toward the cold energy generator 120 via the base 111 and the container combining space 126b.

The embodiments of the present invention have at least the following advantages.

Food items contained in the food processor may be kept or prepared fresh.

Cold food such as ice cream or slush may be made.

The advantages according to the present invention are not limited by what is exemplified above, but other various advantages are included in the specification.

It should be understood that those skilled in the art may embody the technical configuration in other specific forms without changing the technical spirits and essential features of the present invention. Therefore, it should be understood that the embodiments described above are exemplary and not restrictive in all aspects, and the scope of the present invention is defined by the appended claims rather than the above specific descriptions. It should be interpreted that all the changed and modified forms derived from the meaning, scope and equivalent concepts of the claims are included in the scope of the present invention.

What is claimed is:

1. A food processor comprising:
    a main body; and
    a container that forms a food-containing space for containing food items and is detachably mounted to the main body, wherein the main body comprises a cold energy generator for transmitting cold energy to the container by coming into contact with the container and forming a refrigeration space for containing a part of the container, with the container mounted on the main body;
    the cold energy generator comprises a cold energy transfer plate that determines a lateral shape of the refrigeration space and a cold energy generating unit that surrounds a side of the refrigeration space; and
    the cold energy transfer plate is ring-shaped, with inside and outside formed on different planes and the inside being closer to the center of the main body than the outside,
    wherein the container comprises a processing member that is rotatably mounted within the food-containing space and processes the food items, the main body further comprises a base including a motor and a power transmitter for transmitting torque of the motor to the processing member, and the cold energy generator is provided on the base in such a manner that an end of the power transmitter is externally exposed,
    wherein the cold energy generating unit comprises a heat-transfer element for generating cold energy,
    wherein the cold energy generator further comprises:
        a heat sink for supporting the heat-transfer element and dissipating heat generated from the heat-transfer element; and
        a hot air vent port for releasing hot air dissipated by the heat sink,
    wherein the hot air vent port forms a portion of a side of the main body, and
    wherein the refrigeration space forms a container receiving space for receiving a bottom of the container, the heat-transfer element, the heat sink, and the hot air vent port are configured to surround a side of the container receiving space, and the end of the power transmitter is exposed within the container receiving space.

2. The food processor of claim 1, wherein the container comprises a conductive plate for conducting cold energy provided by the cold energy generator to the food-containing space by coming into contact with the cold energy transfer plate.

3. The food processor of claim 2, wherein the conductive plate is detachably mounted to the container.

4. The food processor of claim 1, wherein the heat-transfer element comprises a Peltier element,
    the Peltier element having a heat-generating surface facing the heat sink and a heat-absorbing surface facing the container.

5. The food processor of claim 1, wherein the cold energy generating unit comprises a plurality of heat-transfer elements including the heat-transfer element, the plurality of heat-transfer elements being arranged to surround the side of the refrigeration space, and the heat sink surrounds the side of the refrigeration space, supports the heat-transfer elements, and dissipates heat generated from the heat-transfer elements.

6. The food processor of claim 1, wherein the refrigeration space has a bowl shape in which the cross-sectional area increases towards the container, in order to hold the part of the container in the refrigeration space and allow the cold energy generator to support the container.

7. The food processor of claim 6, wherein the part of the container held in the refrigeration space has a wedge shape corresponding to the bowl shape, and the part of the container is formed with a conductive plate that conducts cold energy transmitted from the cold energy transfer plate to the food-containing space by coming into contact with the cold energy transfer plate, with the container mounted on the main body.

8. The food processor of claim 1, wherein the power transmitter is connected to the processing member through the refrigeration space.

9. The food processor of claim 1, wherein the cold energy generator further comprises a container combining space formed below the refrigeration space so as to connect to the refrigeration space, and the power transmitter is exposed to the container combining space and connected to the processing member.

10. The food processor of claim 1, wherein the cold energy transfer plate that is located between the heat-transfer element and the container, transmits the cold energy of the heat-transfer element to the container, and allows the container to be seated in place.

11. The food processor of claim 1, wherein the main body further comprises a blower unit that supplies air to the cold energy generator and allows the air to flow around the container after the air passes through the cold energy generator and cools down.

12. The food processor of claim 11, further comprising an enclosure for enclosing the container,
   wherein the air provided by the blower unit is supplied between the container and the enclosure after the air passes through the cold energy generator and cools down.

* * * * *